(12) United States Patent
Theaker et al.

(10) Patent No.: US 10,273,426 B2
(45) Date of Patent: *Apr. 30, 2019

(54) ADDITIVES FOR FUELS AND OILS COMPRISING FUNCTIONALISED DIBLOCK COPOLYMERS

(71) Applicant: Infineum International Limited, Abingdon (GB)

(72) Inventors: Giles W. Theaker, Hadleigh (GB); Kenneth Lewtas, Wantage (GB); Peter M. Wright, Faringdon (GB); Benjamin D. Hornby, Didcot (GB); Christopher J. Kay, Coventry (GB); Peter Scott, Kenilworth (GB)

(73) Assignee: INFINEUM INTERNATIONAL LIMITED (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,901

(22) Filed: Sep. 15, 2016

(65) Prior Publication Data

US 2017/0190995 A1   Jul. 6, 2017

(30) Foreign Application Priority Data

Sep. 16, 2015 (EP) .................................... 15185482

(51) Int. Cl.
 *C10M 143/10* (2006.01)
 *C10L 10/16* (2006.01)
 (Continued)

(52) U.S. Cl.
 CPC ............ *C10L 10/16* (2013.01); *C08F 293/00* (2013.01); *C08F 295/00* (2013.01); *C08F 297/06* (2013.01); *C08L 53/00* (2013.01); *C10L 1/165* (2013.01); *C10L 1/1641* (2013.01); *C10L 1/1658* (2013.01); *C10L 1/1666* (2013.01); *C10L 1/1963* (2013.01); *C10L 1/1966* (2013.01); *C10L 1/1973* (2013.01); *C10L 10/14* (2013.01); *C10M 105/00* (2013.01); *C10M 143/10* (2013.01); *C10M 145/02* (2013.01); *C10M 145/08* (2013.01); *C10M 145/14* (2013.01); *C10M 145/16* (2013.01); *C08L 2203/40* (2013.01); *C10L 2250/04* (2013.01);
 (Continued)

(58) Field of Classification Search
 CPC .............. C10M 143/10; C10M 145/02; C10M 2205/022; C10M 2205/04
 See application file for complete search history.

(56) References Cited

U.S. PATENT DOCUMENTS 5,209,862 A * 5/1993 Soni .......................... C08F 8/04
  508/465
7,550,019 B2 * 6/2009 Krull ........................ C10L 1/143
  44/393

(Continued)

FOREIGN PATENT DOCUMENTS

EP  0368395 A1  5/1990
EP  1696020 A3  8/2008
EP  2684940 A1  1/2014

*Primary Examiner* — Ellen M McAvoy

(57) ABSTRACT

Concentrates containing specific functionalised diblock copolymers serve as effective additives for improving the cold flow behaviour of fuels and oils, the copolymers being derived from a terminally-unsaturated intermediate polymer obtained via a metallocene process involving hydrogen.

19 Claims, 1 Drawing Sheet

(51) Int. Cl.
*C08F 295/00* (2006.01)
*C08F 297/06* (2006.01)
*C10M 105/00* (2006.01)
*C08L 53/00* (2006.01)
*C08F 293/00* (2006.01)
*C10L 1/16* (2006.01)
*C10L 1/197* (2006.01)
*C10M 145/14* (2006.01)
*C10M 145/02* (2006.01)
*C10M 145/08* (2006.01)
*C10M 145/16* (2006.01)
*C10L 1/196* (2006.01)
*C10L 10/14* (2006.01)

(52) U.S. Cl.
CPC .. *C10L 2270/026* (2013.01); *C10M 2205/022* (2013.01); *C10M 2205/04* (2013.01); *C10M 2209/00* (2013.01); *C10M 2209/084* (2013.01); *C10N 2220/021* (2013.01); *C10N 2230/08* (2013.01); *C10N 2240/00* (2013.01); *C10N 2270/02* (2013.01)

(56) References Cited

U.S. PATENT DOCUMENTS

| | | | |
|---|---|---|---|
| 8,357,829 B2* | 1/2013 | Hanefeld | C08F 297/08 508/591 |
| 8,703,666 B2* | 4/2014 | Tsou | C10M 161/00 508/113 |
| 8,778,854 B2* | 7/2014 | Price | C08F 287/00 508/306 |
| 9,315,637 B2* | 4/2016 | Montarnal | B05D 3/107 |
| 9,540,583 B2* | 1/2017 | Waterson | C10M 143/10 |
| 2017/0081458 A1* | 3/2017 | Waterson | C08F 297/02 |

* cited by examiner

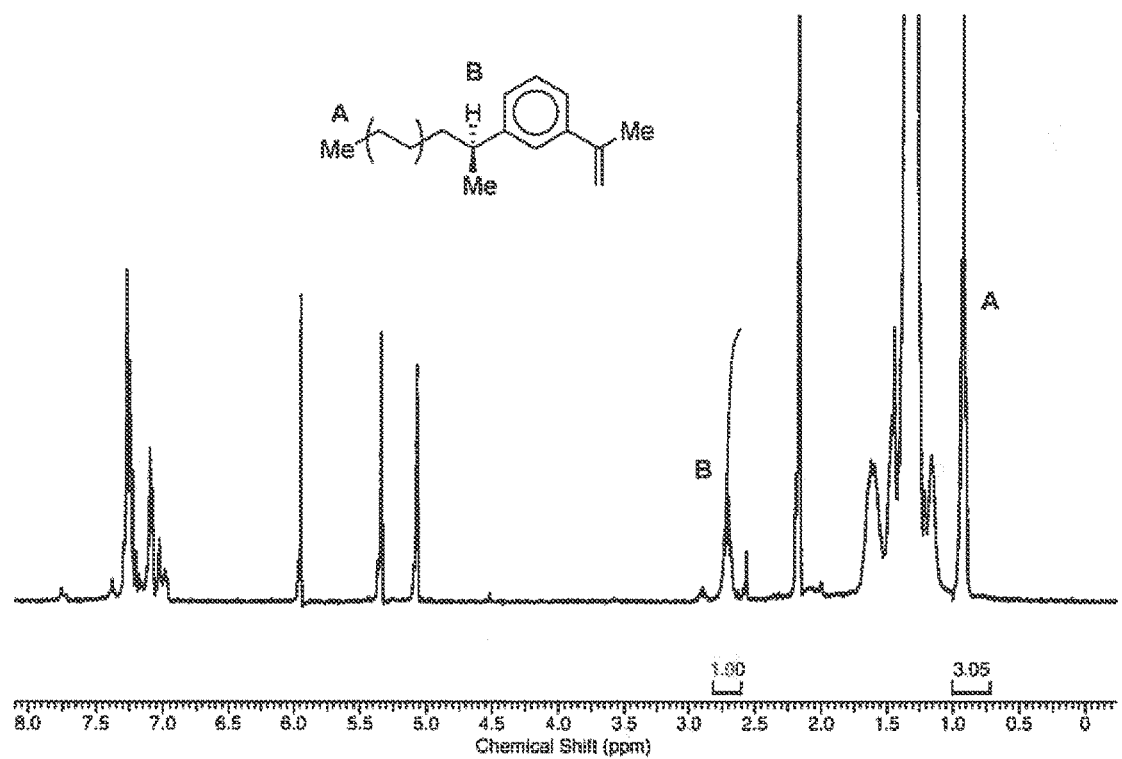

ADDITIVES FOR FUELS AND OILS COMPRISING FUNCTIONALISED DIBLOCK COPOLYMERS

The present invention concerns performance-enhancing additives for fuels and oils, the additives comprising functionalised diblock copolymers having specific structures, together with a process for making such copolymers.

Fuels and oils are produced by processing of crude oil or other liquid or gaseous petroleum feedstocks, or by processing of biologically-derived material such as vegetable or animal oils and fats, or by synthetic means. It is common for the properties of such fuels and oils to be enhanced by the addition of chemical additives.

Many fuels and oils naturally contain n-alkyl-, iso-alkyl- or n-alkenyl-substituted compounds, typically one or more n-alkanes. These compounds exhibit a tendency to crystallise from the fuel or oil during cold storage or use, thereby adversely affecting the cold flow behaviour of the fuel or oil. As a result, transportation of the fuel or oil through the often complex distribution and vehicle systems for such products becomes problematic. Such problems include reduced flow and the blockage of filters, or even blockage of pipes when crystallisation is extensive.

A number of solutions have been proposed over the years to improve cold flow properties of fuels and oils, and commercial additives used today typically include various low molecular-weight ethylene-vinyl ester copolymers. Such copolymers tend to have random copolymeric structures, and are often used in blended mixtures to meet particular target performance needs.

On occasions, block copolymers wherein the blocks have been separately polymerised and then joined by coupling reactions between heteroatomic functional groups have been used. Such heteroatomic couplings are however open to cleavage by hydrolysis or other reactions, leading to degradation of the copolymer and loss of function.

Various other additive types have been proposed to improve the cold flow properties of fuels and oils. These include wax anti-settling additives that typically comprise monomeric (rather than polymeric) compounds that serve to keep crystallised material better dispersed in the fuel. A variety of other monomeric or polymeric materials have also been proposed.

A need remains for additives capable of effectively improving the cold flow properties of fuels and oils, and the present invention is particularly directed to the provision of new copolymeric materials having advantages as additives for this purpose.

It is known that ethylene can be copolymerised with styrene and p-methylstyrene to form either copolymers in which the monomers are interspersed in the growing monomer chain, or materials having a polyethylene chain terminated with a single styrene or p-methylstyrene unit. For the latter, see J. Y. Dong and T. C. Chung, Macromolecules 2002, 35, 1622-1631, which reports the preparation of polyethylene which is substantially terminally functionalised. This is achieved by the addition of a single unit of styrene or p-methylstyrene via a proposed chain-transfer reaction, effected by certain metallocene catalysts in the presence of hydrogen. The resulting materials are thereafter postulated to be suitable to prepare diblock copolymers but no industrial applications for such materials are suggested.

The present invention concerns additives which comprise new functionalised diblock copolymers. The additives are useful in fuels and oils, in particular for improving the cold flow behaviour of a fuel or oil composition derived from one or more petroleum, biological or synthetic sources.

As used in this specification, the term "n-alkyl, iso-alkyl or n-alkenyl substituted compounds" collectively includes those compounds which are n-alkanes, those compounds which are iso-alkanes, those compounds which are n-alkenes, and those compounds containing n-alkyl, iso-alkyl or n-alkenyl groups, which exhibit a tendency to crystallise from fuel or oil at low temperatures. N-alkanes and iso-alkanes and n-alkenes and other compounds bearing n-alkyl, iso-alkyl or n-alkenyl substituents are typically present within fuels and oils, although the relative proportions and distributions of individual compounds differ from source to source. However, the invention described herein is particularly effective in relation to fuels and oils containing one or more n-alkanes, especially one or more long chain n-alkanes such as those having at least 20 carbon atoms, preferably at least 24 carbon atoms, which show a particular tendency to crystallise from the fuel or oil at low temperatures. Most of these fuels or oils will contain a range of such molecules, typically containing from 10 to 30 carbon atoms, although wider and narrower ranges are commonly seen.

The present invention further concerns fuel and oil compositions comprising the additives of the invention, and a method of improving the cold flow behaviour of a fuel or oil composition. In addition, the present invention concerns the new functionalised diblock copolymers of the structure hereinafter defined, along with their use to improve the cold flow behaviour of a fuel or oil composition, and a process for their manufacture.

FIG. 1 is a typical $^1$H NMR spectrum of intermediate compound (II) as used in the synthesis of the functionalised diblock copolymers which are the subject of the present invention.

Accordingly in a first aspect, the present invention provides an additive concentrate comprising a functionalised diblock copolymer in admixture with an organic liquid miscible with fuel or oil, the copolymer comprising two polymeric blocks wherein:
  (i) the first block consists of a chain of ethylenic structural units, optionally interrupted by one or more structural units derived from 1-alkene co-monomers higher than ethylene, and
  (ii) the second block comprises a chain of structural units derived from one or more α,β-unsaturated monomers selected from styrene, substituted styrene, acrylate, methacrylate, diene compounds, vinyl esters, fumarate esters and maleic anhydride and derivatives thereof,
and wherein said first and second blocks are terminally joined such that the copolymer has the following structure:

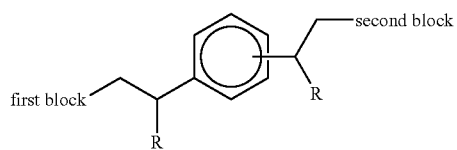

wherein each R group independently represents an alkyl or aryl group, and wherein the aromatic ring substituent joined to the second block is positioned meta or para to the aromatic ring substituent joined to the first block.

In this specification, the word "terminal" when used in relation to a polymer chain (or block) simply refers to the end of the polymer chain (or block), and does not convey any additional mechanistic requirement that the chain (or block) end in question be the end at which the polymerisation reaction terminated. References to "terminally" shall be construed analogously.

In a second aspect, the present invention provides a fuel or oil composition comprising:
  (i) a fuel or oil derived from one or more petroleum, animal, vegetable or synthetic sources, the fuel or oil containing one or more n-alkyl-, iso-alkyl- or n-alkenyl-substituted compounds exhibiting a tendency to crystallise from the fuel or oil in cold storage or use thereby adversely affecting the cold flow behaviour of the fuel or oil, and
  (ii) the additive concentrate of the first aspect of the invention,
wherein the additive concentrate is present in the composition in an amount sufficient to improve the cold flow behaviour of the base fuel or oil during cold storage or use.

In a third aspect, the present invention concerns method of improving the cold flow behaviour of a fuel or oil composition derived from one or more petroleum, animal, vegetable or synthetic sources and containing one or more n-alkyl-, iso-alkyl-or n-alkenyl-substituted compounds exhibiting a tendency to crystallise from the fuel or oil in cold storage or use thereby adversely affecting the cold flow behaviour of the fuel or oil, the method comprising:
  (i) determining the cold flow behaviour of the fuel or oil in question and the improvement that is required;
  (ii) determining the amount of the additive concentrate of the first aspect necessary to effect the desired improvement in cold flow behaviour, and
  (iii) treating the base fuel or oil with that amount of the additive concentrate of the first aspect.

In this specification, the term "cold storage or use" of a fuel or oil refers to storage or use at temperatures below the Cloud Point of the fuel or oil, i.e. below the temperature at which, prior to treatment with the additive concentrate of the invention, the n-alkyl, iso-alkyl or n-alkenyl-substituted compounds present in that fuel or oil visibly begin to exhibit their tendency to crystallise from the fuel or oil. The Cloud Point is a well-known industry test, so-named because it observes the point at which the previously-clear fuel becomes 'cloudy' as fine crystals begin to visibly form from the bulk medium.

The advantageous properties of the additive concentrate are attributed to the nature of the diblock copolymer defined therein. In particular, and without being bound to any particular theory, it is believed that when present in the fuel or oil under cold storage or use conditions the polyethylenic chain of the first block of a copolymer molecule interacts with the growing crystal of n-alkyl-, iso-alkyl- or n-alkenyl-substituted compounds (and particularly n-alkane compounds) as they crystallise from the cold fuel or oil, thereafter inhibiting further crystal growth. This interaction is enabled by the geometry of polyethylenic sequences of the first block aligning with segments of the n-alkyl, iso-alkyl or n-alkenyl groups of the crystallising compounds. The second block of the polymer provides the correct dispersibility within the fuel, and provides steric hindrance to aid the blocking of further crystallisation at crystal growth sites.

In a fourth aspect, the invention is the functionalised diblock copolymer defined under any of the other aspects of the invention.

The first block of the copolymer has a backbone chain of polyethylenic structural units optionally incorporating in the backbone chain, units derived from 1-alkenes higher than ethylene, such that the resulting polymer chain remains an uninterrupted sequence of saturated aliphatic carbon atoms, the residual alkyl groups of the 1-alkene residues being borne as saturated alkyl substituents pendant from the polymer chain.

It is important that the first block of the copolymer be terminally joined to the second block, so as to leave the first block exposed for interacting with the growing crystals in the fuel or oil. As such, it is important that the linkage between the first and second blocks be positioned at the end of the polymeric chain of the first block.

To achieve this terminal positioning of the linkage between the first and second blocks, it is essential that the process by which the copolymer is made be specific for terminal functionalization of the first block. Equally, it is important that the terminal functionalization formed on the first block be sufficiently reactive to enable the subsequent formation of the second block under process conditions that are industrially practical, whilst at the same time not being so highly reactive that unwanted side reactions occur to a significant extent.

The applicant's previous EP 2684940 reported that, in the presence of hydrogen, a metallocene-catalysed polymerisation reaction between ethylene (and optionally higher 1-alkenes) and a compound of the formula (I):

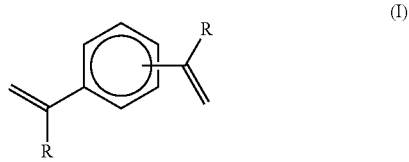

(I)

wherein each R group independently represents an alkyl or aryl group, and wherein the two aromatic ring substituents are positioned meta or para to each other, results in a highly specific reaction product being a terminally unsaturated intermediate compound of the formula (II):

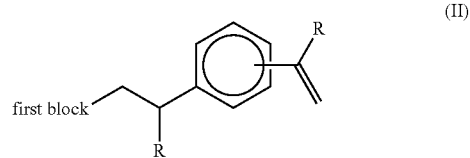

(II)

wherein R is as defined above in relation to compound (I).

EP 2684940 also discussed how compound (II) is, by virtue of its terminal unsaturation, reactive towards subsequent reaction steps. In particular, it was reported that subsequent anionic polymerisation yields a functionalised diblock polymer of the structure:

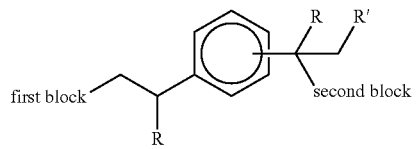

where R' represents hydrogen or an alkyl group, and where R and the first and second blocks are similar to the present invention.

The applicants have now found that a compound (II) above can be reacted under conditions of free-radical polymerisation to yield the functionalised diblock copolymer described in relation to the first embodiment. The second block is found attached to a different carbon atom of the aromatic ring substituent compared to the diblock structures of EP 2684940.

The present invention thus provides a route to new functionalised diblock copolymers via compounds of formulae (I) and (II) above using free radical polymerisation.

In a fifth aspect therefore, the invention is a process for manufacture of a functionalised diblock copolymer comprising two polymeric blocks wherein:

(i) the first block consists of a chain of ethylenic structural units, optionally interrupted by one or more structural units derived from 1-alkene co-monomers higher than ethylene, and (ii) the second block comprises a chain of structural units derived from one or more α,β-unsaturated monomers selected from styrene, substituted styrene, acrylate, methacrylate, diene compounds, vinyl esters, fumarate esters and maleic anhydride and derivatives thereof.

and wherein said first and second blocks of the copolymer are terminally joined such that the copolymer has the following structure:

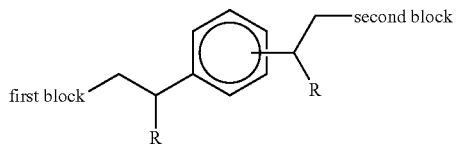

wherein each R group independently represents an alkyl or aryl group, and wherein the aromatic ring substituent joined to the second block is positioned meta or para to the aromatic ring substituent joined to the first block;

the process comprising the following steps:

a) in a first step, polymerising ethylene, and optionally one or more 1-alkene co-monomers higher than ethylene, in the presence of a metallocene catalyst system to form a first polymer block, being a chain consisting of ethylenic structural units optionally bearing pendent alkyl groups originating from 1-alkene comonomer(s), the reaction being carried out in the presence of a compound of the formula (I):

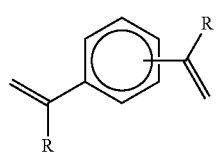

in a reaction vessel pressurised with hydrogen gas, wherein, in the course of the reaction, the compound (I) is terminally incorporated onto the first polymer block resulting in the formation of a terminally unsaturated intermediate of the formula (II):

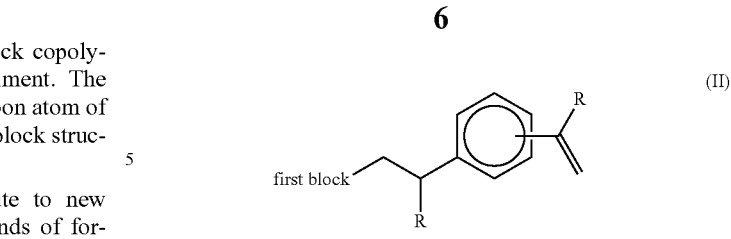

b) in a second step, recovering the intermediate (II) from the reaction mixture of the first step; and c) in a third step, reacting the intermediate (II) at its terminal double bond in a subsequent free-radical polymerisation reaction to form a second polymer block, so yielding a diblock polymer of the structure defined above.

In the process aspect of the invention, step a) is preferably carried out in solution, further preferably at a temperature of at least 50° C.

In the process aspect of the invention, step c) is preferably carried out in the presence of a radical source which initiates polymerisation upon the addition of one or more α,β-unsaturated monomers selected from styrene, substituted styrene, acrylate, methacrylate, diene compounds, vinyl esters, fumarate esters and maleic anhydride and derivatives thereof. As will be known in the art, such a radical source may be a chemical initiator species or it may be an external physical input to the reaction such as light or other radiation source. Preferably the radical source is a chemical initiator species such as a peroxide initiator, an azo-initiator or other such species as will be known to those skilled in the art.

In further aspects, the invention concerns the use of the additive concentrate, and the use of the functionalised diblock copolymers defined therein, to improve the cold flow behaviour of a fuel or oil composition comprising a fuel or oil derived from one or more petroleum, animal, vegetable or synthetic sources, the base fuel containing one or more n-alkyl-, iso-alkyl- or n-alkenyl-substituted compounds, and particularly one or more n-alkanes as hereinafter described, exhibiting a tendency to crystallise from the fuel or oil in cold storage or use thereby adversely affecting the cold flow behaviour of the fuel or oil.

The invention will now be described in more detail as follows.

The additive concentrate of the first aspect comprises the functionalized diblock copolymer defined herein in admixture with an organic liquid miscible in fuel or oil. The term 'in admixture with' as used herein means that the copolymer and organic liquid have been physically mixed together to provide a solution or dispersion of the polymer in the organic liquid, the latter functioning as a solvent or dispersing medium for the copolymer. Such liquids are sometimes collectively termed 'carrier fluids' in the art and assist the dispersion or dissolution of the additives they contain or oil, when the additive concentrate is blended into the base fuel or oil. Examples of suitable liquids include hydrocarbon solvents such as naphtha, kerosene, diesel and heater oil, aromatic hydrocarbons such as those sold under the 'SOLVESSO' trade name, alcohols, ethers and other oxygenates and paraffinic hydrocarbons such as hexane, pentane and isoparaffins. Likewise, the term 'miscible' as used herein means capable of being physically mixed with fuel or oil to form either a solution or a dispersion in the fuel or oil. The liquid is chosen having regard to its compatibility with both the polymer and the fuel or oil in question, and is a matter of routine choice for one skilled in the art. The additive concentrate may suitably comprise 1 to 95% by weight of organic liquid, preferably 10 to 70%, for example 25 to 60%, the remainder being the essential copolymer and any additional additives required to fulfill different purposes within the fuel or oil.

The functionalized diblock copolymer comprises two polymeric blocks wherein:
(i) the first block consists of a chain of ethylenic structural units, optionally interrupted by one or more structural units derived from 1-alkene co-monomers higher than ethylene, and
(ii) the second block comprises a chain of structural units derived from one or more α,β-unsaturated monomers selected from styrene, substituted styrene, acrylate, methacrylate, diene compounds, vinyl esters, fumarate esters and maleic anhydride and derivatives thereof, and wherein said first and second blocks are terminally joined such that the copolymer has the following structure:

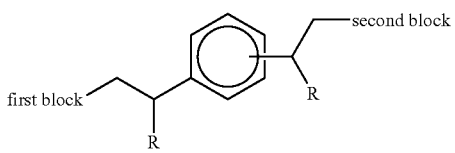

wherein each R group independently represents an alkyl or aryl group, and wherein the aromatic ring substituent joined to the second block is positioned meta or para to the aromatic ring substituent joined to the first block.

Preferably, each R group independently represents an alkyl group having from 1 to 4 carbon atoms. More preferably, each R group is methyl.

Preferably, the aromatic ring substituent joined to the second block is positioned meta to the aromatic ring substituent joined to the first block.

In one preferred embodiment, the first block of the copolymer consists of a polyethylene chain.

In another preferred embodiment, the first block of the copolymer consists of a polyethylene chain interrupted by structural units derived from 1-hexene.

In another preferred embodiment, the first block of the copolymer consists of a polyethylene chain interrupted by structural units derived from 1-octene.

If desired, the first block may after formation be provided with some polarity by the grafting of unsaturated monomers such as maleic anhydride onto the first block.

When one or more 1-alkene monomers are used in conjunction with ethylene to form the first block of the copolymer preferably the total proportion of 1-alkene monomers is between 1 and 50 mol %, preferably between 2 and 30 mol %, the remainder of the first block being ethylene.

In one preferred embodiment, the second block of the copolymer consists of a chain of structural units derived from one or more α,β-unsaturated monomers selected from styrene, substituted styrene, acrylate, methacrylate, diene compounds, vinyl esters, fumarate esters and maleic anhydride and derivatives thereof.

In a preferred embodiment, the second block of the copolymer consists of a homo- or copolymeric chain derived from one or more acrylate or methacrylate monomers. In particular, the (meth)acrylate monomer or monomers selected for the second block usefully comprise one or more (meth)acrylate compounds bearing a $C_4$-$C_{22}$ alkyl substituent, which may be branched or straight chain alkyl. Preferably the second block consists of a homo- or polymeric chain derived from one or more such monomers. Examples of such monomers are: 2-ethyl hexyl (meth)acrylate, isodecyl (meth)acrylate, t-butyl (meth)acrylate, dodecyl (meth)acrylate, decyl(meth)acrylate, and those with a $C_{12}$-$C_{15}$ chain length based on Neodol 25 from Shell.

In a another preferred embodiment, the second block of the copolymer consists of a homo- or copolymeric chain derived from one or more vinyl ester monomers. Examples include vinyl acetate, vinyl 2-ethylhexnaoate, vinyl octanoate, vinyl benzoate, vinyl decanoate, vinyl neodecanoate, vinyl pivalate, vinyl propionoate, vinyl stearate and vinyl valerate. Vinyl 2-ethylhexnaoate is particularly preferred.

In another preferred embodiment, the second block of the copolymer consists of a chain of structural units derived from one or more diene compounds. These dienes may be unhydrogenated, hydrogenated or partially hydrogenated dienes. More preferably, the second block of the copolymer consists of a homo- or copolymeric chain derived from isoprene or butadiene, or a mixture thereof.

The second block acts, in part, as a solubilising and/or dispersing group for the copolymer.

Preferably, the first block of the copolymer has a number average molecular weight (Mn), as measured by GPC against polystyrene standards, in the range of 500 to 10,000 and preferably in the range of 1,000 to 8,000, for example, 1,000 to 5,000.

Preferably, the second block of the copolymer has a number average molecular weight (Mn), as measured by GPC against polystyrene standards, in the range of 1,000 to 100,000 and preferably in the range of 3,000 to 60,000, for example, 3,000 to 30.000.

Preferably the ratio of the Mn of the first block of the copolymer to the Mn of second block of the copolymer is in the range from 1:1 to 1:20.

The fuel or oil composition of the second aspect comprises:
(i) a fuel or oil derived from one or more petroleum, animal, vegetable or synthetic sources, the base fuel containing one or more n-alkyl-, iso-alkyl- or n-alkenyl-substituted compounds exhibiting a tendency to crystallise from the fuel or oil in cold storage or use thereby adversely affecting the cold flow behaviour of the fuel or oil, and
(ii) the additive concentrate of the first aspect,
wherein the additive is present in the composition in an amount sufficient to improve the cold flow behaviour of the fuel or oil during cold storage or use.

The fuel may be a petroleum-based fuel oil, especially a middle distillate fuel oil. Such distillate fuel oils generally boil within the range of from 110° C. to 500° C., e.g. 150° C. to 400° C. The invention is applicable to middle distillate fuel oils of all types, including the distillates having a 90%-20% boiling temperature difference, as measured in accordance with ASTM D-86, of 50° C. or more.

The fuel may comprise atmospheric distillate or vacuum distillate, cracked gas oil, or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or may also contain vacuum gas oil or cracked gas oil or both. The fuel may also contain major or minor amounts of components derived from the Fischer-Tropsch process. Fischer-Tropsch fuels, also known as FT fuels, include those that are described as gas-to-liquid fuels, coal and/or biomass conversion fuels. To make such fuels, syngas ($CO+H_2$) is first generated and then converted to normal paraffins and olefins by a Fischer-Tropsch process. The normal paraffins may then be modified by processes such as catalytic cracking/reforming or isomerisation, hydrocracking and hydroisomerisation to yield a variety of hydrocarbons such as iso-paraffins, cyclo-paraffins and aromatic compounds. The resulting FT fuel can be used as such or in combination with other fuel components and fuel types such as those mentioned in this specification.

Also suitable are fuels containing fatty acid alkyl esters made from oils derived from animal or vegetable materials, often called biofuels or biodiesels. Biofuels are believed by some to be less damaging to the environment on combustion and are obtained from a renewable source. Other forms of biofuels are also included in the invention such as hydrogenated vegetable oil (HVO) and oil derived from alternative sources such as algae.

Examples of fuels derived from animal or vegetable material are rapeseed oil, canola oil, coriander oil, soyabean oil, cottonseed oil, sunflower oil, castor oil, olive oil, peanut oil, maize oil, almond oil, palm kernel oil, coconut oil, mustard seed oil, jatropha oil, beef tallow and fish oils. Further examples include fuel oils derived from corn, jute, sesame, shea nut, ground nut and linseed oil and may be derived therefrom by methods known in the art. Rapeseed oil, which is a mixture of fatty acids partially esterified with glycerol is available in large quantities and can be obtained in a simple way by pressing from rapeseed. Recycled oils such as used kitchen oils are also suitable.

As alkyl esters of fatty acids, consideration may be given to the following, for example as commercial mixtures: the ethyl, propyl, butyl and especially methyl esters of fatty acids with 12 to 22 carbon atoms, for example of lauric acid, myristic acid, palmitic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid, which have an iodine number from 50 to 150, especially 90 to 125. Mixtures with particularly advantageous properties are those which contain mainly, i.e. to at least 50 wt % methyl esters of fatty acids with 16 to 22 carbon atoms and 1, 2 or 3 double bonds. The preferred alkyl esters of fatty acids are the methyl esters of oleic acid, linoleic acid, linolenic acid and erucic acid.

Commercial mixtures of the stated kind are obtained for example by cleavage and esterification of animal and vegetable fats and oils by their transesterification with lower (ca. $C_1$ to $C_6$) aliphatic alcohols. For production of alkyl esters of fatty acids it is advantageous to start from fats and oils which contain low levels of saturated acids, less than 20%, and which have an iodine number of less than 130. Blends of the following esters or oils are suitable, e.g. rapeseed, sunflower, canola, coriander, castor, soyabean, peanut, cotton seed, beef tallow etc. Alkyl esters of fatty acids based on certain varieties of rapeseed oil having more than 80 wt % of unsaturated fatty acids with 18 carbon atoms, are particularly suitable.

Whilst all of the above biofuels may be used as fuels, preferred are vegetable oil derivatives, of which particularly preferred biofuels are alkyl ester derivatives of rapeseed oil, cottonseed oil, soyabean oil, sunflower oil, olive oil, or palm oil, rapeseed oil methyl ester being especially preferred. Such fatty acid methyl esters are often referred to in the art as FAME.

The invention is also applicable to pure biofuels. In one embodiment therefore, the fuel comprises essentially 100% by weight of a fuel derived from a plant or animal source, preferably essentially 100% by weight of fatty acid alkyl esters, most preferably fatty acid methyl esters.

Biofuels are commonly used in combination with petroleum-derived fuels. The present invention is also applicable to mixtures of biofuel and petroleum-derived fuels in any ratio. Such fuels are often termed "Bx" fuels where x represents the percentage by weight of biofuel in the biofuel-petroleum blend. Examples, include fuels where x is 2 or above, preferably 5 or above, for example up to 10, 25, 50, or 95. Preferably the biofuel component in such Bx base fuels comprises fatty acid alkyl esters, most preferably fatty acid methyl esters.

The fuel, whether petroleum or vegetable or animal-derived, or synthetic, preferably has a low sulphur content. Typically, the sulphur content of the fuel will be less than 500 ppm (parts per million by weight). Preferably, the sulphur content of the fuel will be less than 100 ppm, for example, less than 50 ppm. Fuels with even lower sulphur contents, for example less that 20 ppm or less than 10 ppm are also suitable.

Oils useful in the context of the present invention include those oils of lubricating viscosity, preferably selected from natural lubricating oils, synthetic lubricating oils and mixtures thereof. The oil may range in viscosity from light distillate mineral oils to heavy lubricating oils such as gasoline engine oils, mineral lubricating oils and heavy duty diesel oils, and marine lubricants. Generally, the viscosity of the oil ranges from about 2 centistokes to about 40 centistokes, especially from about 4 centistokes to about 20 centistokes, as measured at 100° C.

Natural oils include animal oils and vegetable oils (e.g., castor oil, lard oil); liquid petroleum oils and hydrorefined, solvent-treated or acid-treated mineral oils of the paraffinic, naphthenic and mixed paraffinic-naphthenic types. Oils of lubricating viscosity derived from coal or shale also serve as useful oils.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivative, analogs and homologs thereof. Also useful are synthetic oils derived from a gas to liquid process from Fischer-Tropsch synthesized hydrocarbons, which are commonly referred to as gas to liquid, or "GTL" oils.

Alkylene oxide polymers and interpolymers and derivatives thereof where the terminal hydroxyl groups have been modified by esterification, etherification, etc., constitute another class of known synthetic oils. These are exemplified by polyoxyalkylene polymers prepared by polymerization of ethylene oxide or propylene oxide, and the alkyl and aryl ethers of polyoxyalkylene polymers (e.g., methyl-polyisopropylene glycol ether having a molecular weight of 1000 or diphenyl ether of poly-ethylene glycol having a molecular weight of 1000 to 1500); and mono- and polycarboxylic esters thereof, for example, the acetic acid esters, mixed $C_3$-$C_8$ fatty acid esters and $C_{13}$ oxo acid diester of tetraethylene glycol.

Another suitable class of synthetic oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of such esters includes dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetrnethylene glycol and two moles of 2-ethylhexanoic acid.

Esters useful as synthetic oils also include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils comprise another useful class of synthetic lubricants: such oils include tetraethyl silicate, tetraisopropyl silicate, tetra-(2-ethylhexyl)silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes and poly(methylphenyl)siloxanes. Other synthetic lubricating oils include liquid esters of phosphorous-containing acids (e.g., tricresyl phosphate, trioctyl phosphate, diethyl ester of decylphosphonic acid) and polymeric tetrahydrofurans.

Oils of lubricating viscosity may comprise a Group I, Group II or Group III, base stock or base oil blends of the aforementioned base stocks. Preferably, the oil is of lubricating viscosity and is a Group II or Group III base stock, or a mixture thereof, or a mixture of a Group I base stock and one or more a Group II and Group III. Preferably, a major amount of the oil of lubricating viscosity is a Group II, Group III, Group IV or Group V base stock, or a mixture thereof. The base stock, or base stock blend preferably has a saturate content of at least 65%, more preferably at least 75%, such as at least 85%. Most preferably, the base stock, or base stock blend, has a saturate content of greater than 90%. Preferably, the oil or oil blend will have a sulfur content of less than 1%, preferably less than 0.6%, most preferably less than 0.4%, by weight. Equally, the oil or oil blend may be hydrodesulphurised to sulphur content of very low levels, typically 1500 ppm by weight or less, preferably 15 ppm by weight or less.

Preferably the volatility of the oil or oil blend, as measured by the Noack volatility test (ASTM D5880), is less than or equal to 30%, preferably less than or equal to 25%, more preferably less than or equal to 20%, most preferably less than or equal 16%. Preferably, the viscosity index (VI) of the oil or oil blend is at least 85, preferably at least 100, most preferably from about 105 to 140.

Definitions for the base stocks and oils suitable for use in this invention are the same as those found in the American Petroleum Institute (API) publication "Engine Oil Licensing and Certification System", Industry Services Department, Fourteenth Edition, December 1996, Addendum 1, December 1998. Said publication categorizes base stocks as follows:
  a) Group I base stocks contain less than 90 percent saturates and/or greater than 0.03 percent sulfur and have a viscosity index greater than or equal to 80 and less than 120 using the test methods specified in Table 1.
  b) Group II base stocks contain greater than or equal to 90 percent saturates and less than or equal to 0.03 percent sulfur and have a viscosity index greater than or equal to 80 and less than 120 using the test methods specified in Table 1.
  c) Group III base stocks contain greater than or equal to 90 percent saturates and less than or equal to 0.03 percent sulfur and have a viscosity index greater than or equal to 120 using the test methods specified in Table 1.
  d) Group IV base stocks are polyalphaolefins (PAO).
  e) Group V base stocks include all other base stocks not included in Group I, II, III, or IV.

The additive concentrate of the first aspect is added to the fuel or oil in an amount sufficient to improve the cold flow behaviour of the fuel or oil during cold storage or use. In practice, the resulting amount of essential copolymer present in the fuel or oil in question may vary with the type of fuel or oil, and the cold flow behavior desired, and will be determined by the individual circumstances and needs.

Suitably however, the additive concentrate will be added to fuels in such an amount that it provides the essential copolymer in an amount of between 10 and 5,000, preferably between 10 and 1.000, more preferably between 50 and 500 ppm by weight, based on the weight of the fuel.

Also suitably the additive concentrate will be added to oils in such an amount that it provides the essential copolymer in an amount of between 10 and 5,000, preferably between 10 and 1,000, more preferably between 50 and 500 ppm by weight, based on the weight of the oil.

The additive concentrate may further incorporate additional performance enhancing additives or such additives may be added separately to the fuels or oils. Such additional additives will be known to those skilled in the art and include other additives to improve the cold flow behaviour of the fuel or oil, additives to prevent wax settling and similar. In an embodiment, the copolymers of the invention are used in combination with one or more conventional cold flow additives.

With regard to the second and third aspects of the invention, improvement of the cold flow behaviour of a fuel or oil will be understood by those skilled in the art to refer to the ability of the fuel or oil to flow, to be pumped or to pass through filter media when cooled to low ambient temperatures such as may be experienced by vehicles operating in regions with cold climates. For example, tests such as the Cold Filter Plugging Point test (CFPP) and the Pour Point test (PP) are widely used in the industry to determine fuel and/or oil operability at low temperatures. These tests are designed to determine filterability and/or flowability at temperatures wherein the tendency towards crystallization of n-alkyl, iso-alkyl or n-alkenyl substituted compounds, and particularly n-alkanes, is exhibited. Improvements in this cold flow behavior due to the presence of the additive of the invention can be readily determined by comparative tests of the fuel with or without the additive in question.

More preferably, these preferred compositions of the second aspect comprise a fuel which is a diesel fuel or heating oil, being either a petroleum-derived base fuel, or a mixture of petroleum-derived base fuel and vegetable-derived base fuel, or a vegetable-derived base fuel.

The third aspect of the invention provides a method of improving the cold flow behaviour of a fuel or oil composition derived from one or more petroleum, animal, vegetable or synthetic sources and containing one or more n-alkyl-, iso-alkyl-or n-alkenyl-substituted compounds exhibiting a tendency to crystallise from the fuel or oil in cold storage or use thereby adversely affecting the cold flow behaviour of the fuel or oil, the method comprising:

(i) determining the cold flow behaviour of the fuel or oil in question and the improvement that is required;
(ii) determining the amount of the additive concentrate of the first aspect necessary to effect the desired improvement in cold flow behaviour; and
(iii) treating the fuel or oil with that amount of the additive concentrate.

In the method aspect of the invention, the fuel and oil, and the additive concentrate, are those defined in relation to the first and second aspects above.

The method involves determining the necessary amount of additive for a given fuel or oil in a given circumstance. In practice, the desired cold flow properties of a fuel or oil are usually specified by the fuel or oil manufacturer, in relation to desired performance in the industry test(s) adopted by that manufacturer as most relevant to the environment the fuel or oil is likely to meet. These performance targets, when compared to the performance of the fuel alone, provide a clear target for the necessary improvement which the additive must achieve in a given case. It is a matter of normal skill in the art to thereafter determine the amount of additive that must be used to achieve that desired improvement, through comparative experiments in those test(s) specified by the manufacturer.

The preferred embodiments of the copolymer of the fourth aspect of the invention are those defined in relation to any of the other aspects of the invention.

The preferred embodiments of the process of the fifth aspect of the invention are those giving rise to the preferred embodiments of the functionalised block copolymer defined in relation to the other aspects of the invention.

Preferably the first step a) of the process proceeds at a reaction medium temperature of at least 50° C., preferably at least 55° C., and more preferably at least 58° C., such as at least 60° C. This temperature helps to avoid compound (I) homopolymerising significantly in the presence of the metallocene catalyst, and thus avoids an unwanted competing reaction. Preferably, the reaction temperature is maintained within the range of 55° C. to 90° C., more preferably in the range of 58° C. to 80° C.

The first step a) of the process is also essentially conducted in a vessel under pressure in the presence of hydrogen gas. Hydrogen is required to enable the necessary reaction to take place between the growing polyethylenic chain, the metallocene catalyst and the compound (I), leading to the terminal insertion of the compound (I) on the polyethylenic chain. Maintaining the pressure of the system during this step is also important to obtaining good productivity in the reaction and effective molecular weight control of the first polymer block.

Preferably, the partial pressure of hydrogen in the reaction vessel is set to between 170 and 280 kPa, preferably in the range of 185 to 242 kPa. Also preferably, the partial pressure of ethylene in the reaction vessel is preferably set to between 35 and 440 kPa, more preferably in the range of 70 to 415 kPa, most preferably in the range of 80 to 285 kPa.

More preferably, the partial pressure of hydrogen in the reaction vessel is set to between 185 to 242 kPa and the partial pressure of ethylene is set to between 80 and 285 kPa.

Suitable metallocene catalysts comprise a transition metal, particularly a metal from group IV of the periodic table such as Ti, Zr or Hf, with one or more ligands such as cyclopentadienyl ("Cp"), substituted cyclopentadienyl (including indenyl, fluorenyl and their derivatives), and bridged variants of the above. Additional ligands may be coordinated or bonded to the metal by heteroatoms such as N, O, S or P and may include bridges to Cp-type ligands as above.

Such catalysts are normally synthesised and stored as a metal dichloride/dialkyl (e.g. dibenzyl) or mono-alkyl-mono-chloride species ("pre-catalyst"). This is activated in solution by addition of a co-catalyst, generally methylaluminoxane (MAO), but alternatively a combination of a boron containing species such as $Ph_3C+B(C_6F_5)_4$— and a trialkylaluminium species such as $i-(C_4H_9)_3Al$.

In practice, the choice of metallocene catalyst will be exercised by the skilled chemist in accordance with conventional principles. Amongst relevant principles, the essential presence of hydrogen in the reaction naturally dictates that the catalyst chosen should be one whose function is not impaired by hydrogen.

Examples of such catalysts include $Cp_2MCl_2$, $Cp^*_2MCl_2$, $EBIMCl_2$, $Flu(Ph_2Me)CpMCl_2$, and $Cp(Me)_4(Me_2Si)Nt$-$BuMCl_2$, wherein M represents a transition metal. Preferred catalysts are catalysts in which M represents zirconium. An example catalyst is $Cp_2ZrCl_2$ and an example co-catalyst is MAO.

Example of Step a) of the Process—Preparation of Compound (II)

A 250 ml stainless steel Parr reactor with internal cooling coil was dried under vacuum at 100° C. for 1 hour before addition of a comonomer solution consisting of toluene (50 ml), 1,3-diisopropenylbenzene (30 ml, 0.175 mol—compound (I)) and MAO solution (3 ml, 1800 equivalents) via cannula with the reactor initially heated to 50° C. The reactor was purged for 5 min with hydrogen (240 kPa) before the addition of ethylene (85 kPa). Once ethylene uptake had stabilised, a toluene solution of metallocene catalyst $Cp_2ZrCl_2$ ($2.5 \times 10^{-6}$ mol) prepared in the glove box was injected using an overpressure of argon. After catalyst addition, the temperature and gas uptake were continuously monitored. The reaction temperature was maintained at 60° C. The reaction was stopped after 15 min by careful addition of methanol (2×10 ml). The polymer product was precipitated by pouring into a solution of 5% HCl in methanol (600 ml) with stirring for 1 h. The product was recovered by filtration and washed with methanol, and once dry washed again with tetrahydrofuran (200 ml). The polymer product, 1,3-diisopropenylbenzene terminated polyethylene (compound (II), being PE-t-DIB) was dried by heating to 70° C. in vacuo for 24 h, giving a yield of 2.655 g.

The productivity of the reaction was 4235 kg(Polymer)/(mol[cat.]h). The 1,3-DIB content of the resulting polymer (compound (II)) was 2.54 mol % and it had an $M_W$ of 3269 g $mol^{-1}$, an $M_n$ of 1893 g $mol^{-1}$, and Dispersity (PDi) of 1.73, as measured by high temperature GPC performed in 1,2,4-trichlorobenzene at 160° C. at a flow rate of 1 ml/min on a Polymer Labs PL220 fitted with a 5 cm PLgel guard column (5 µM), and two PLgel 30 cm Mixed-D columns (5 µM). Calibration was achieved using Polymer Labs PS-M Easivial polystyrene standards. The molecular weight is determined by comparing the retention time of the polymer with that of the calibration curve at that retention time.

The characterisation of compound (II), to confirm the desired terminal functionalisation structure is obtained, can be conducted by nuclear magnetic resonance spectroscopy.

For example, NMR spectra can be recorded on Bruker DPX400 and DPX500 spectrometers, wherein $^1H$ and $^{13}C$ NMR spectra are referenced internally using the solvent resonances relative to tetramethylsilane. Routine NMR assignments (including polymer samples) can be confirmed by $^1H$-$^1H$ (COSY), $^{13}C$-$^1H$ (HMQC) and $^{13}C$-$^1H$ (HMBC) correlation experiments where necessary.

In particular, to confirm the terminal insertion of the compound (I), $^1H$ NMR spectroscopy can be employed. For example, shown in the attached FIG. 1 is a typical $^1$H NMR spectra for a compound (II) as produced by the above process step a), employing ethylene as the constituent of the first polymer block, and 1,3-diisopropenylbenzene ("1,3-DIB") as compound I. Determination of the amount of terminal insertion is achieved by comparison of the spectroscopic peaks for a methyl group at one end of the polyethylene chain which has three protons (labelled A in the figure), and a single proton on the benzylic carbon of the 1,3-DIB molecule remaining after step a) of the reaction (labelled B in the figure). Any 1,3-DIB incorporated in-chain would not have a proton on this carbon, and thus this proton resonance serves to distinguish terminal insertion of the 1,3-DIB.

The $^1$H NMR peaks associated with these protons (A and B) have chemical shifts of 0.91 ppm and 2.71 ppm respectively (chemical shifts are measured against the residual solvent signal in $d_2$-TCE at 5.94 ppm). Comparing the integrals of these two peaks gives the amount of terminal insertion by 1,3-DIB. As can be seen for example in the spectrum shown, an integrals ratio of the respective peaks of 3:1 (A:B) indicates that essentially each polyethylene chain is terminally functionalised by the residue from the 1,3-DIB.

An advantage of the process used is in securing a high degree of terminal functionalization of the first block, as determined by the above spectroscopic method. Further examples of step a) of the process and the results achieved are shown below:

Further examples of compounds of formula (II) were prepared by using mixtures of ethylene and a 1-alkene instead of ethylene alone. Examples using a mixture of 1-hexene and ethylene gave compounds of formula (II) with molecular weights (Mn) of around 4,000 using a $Cp_2ZrCl_2$ catalyst and around 8,000 when an $Et(Ind)ZrCl_2$ catalyst was used. A $Cp_2ZrCl_2$ catalyst was used to react a mixture of ethylene and 1-octene to give a compound of formula (II) having a molecular weight (Mn) of around 5,000.

In each case, the reactions resulted in essentially complete terminal functionalization of the polyethylenic or polyethylene/1-alkene chains by co-monomer compound (I), so forming compound (II) to a highly specific degree.

If desired, the compound II can be isolated as demonstrated in the worked example 1, or by other means of recovery known to the polymer chemist.

The third step c) of the process of the invention involves the formation of the second block by way of a free-radical polymerisation. The following worked examples show how this may be done however variations and alternatives to these schemes will be known to the skilled chemist.

Synthesis of a Polyethylene—Polybutylacrylate Copolymer 1,3 diisopropenylbenzene initiated polyethylene (PE-i-DIB, Mn=3,300, 0.20 g, $6.1\times10^{-5}$ mnol), n-butyl acrylate (0.87 ml, $6.1\times10^{-3}$ mol) and benzoyl peroxide (75%, 0.20 g, $6.1\times10^{-4}$ mol) were charged to a 10 ml glass ampoule equipped with a stirrer bar. The volume was made up to 8.2 ml with toluene. The ampoule was sealed and freeze-thaw degassed three times before being heated to 125° C. with stirring for 128 minutes. The reaction mixture was then cooled rapidly by immersing the ampoule in liquid nitrogen and then poured into methanol (200 ml) with stirring. The precipitate so formed was allowed to settle and then was filtered and dried under vacuum. This yielded 0.34 g of copolymer having an Mn of 5,500.

Synthesis of a Polyethylene—Polystyrene Copolymer

The synthesis above was repeated replacing the n-butyl acrylate with styrene (3.5 ml, 0.03 mol). This yielded 1.40 g of copolymer having an Mn of 15,000.

Synthesis of a Polyethylene/1-Hexene—Polybutylacrylate Copolymer 1,3 diisopropenylbenzene initiated polyethylene/1-hexene (P(E/H)-i-DIB, Mn=3,900, 6.2 mol % 1-hexene, 0.20 g, $5.1\times10^{-5}$ mol), n-butyl acrylate (0.74 ml, $5.1\times10^{-3}$ mol) and benzoyl peroxide (75%, 0.17 g, $5.1\times10^{-4}$ mol) were charged to a 10 ml glass ampoule equipped with a stirrer bar. The volume was made up to 8.2 ml with toluene. The ampoule was sealed and freeze-thaw degassed three times before being heated to 125° C. with stirring for 128 minutes. The reaction mixture was then cooled rapidly by immersing the ampoule in liquid nitrogen and then poured into methanol (200 ml) with stirring. The precipitate so formed was allowed to settle and then was filtered and dried under vacuum. This yielded 0.39 g of copolymer having an Mn of 7,000.

Synthesis of a Polyethylene/1-hexene—Polystyrene Copolymer

The synthesis above was repeated replacing the n-butyl acrylate with styrene (2.9 ml, 0.026 mol). This yielded 0.69 g of copolymer having an Mn of 29,000.

The effectiveness of the functionalised diblock copolymers described herein in improving the cold flow behaviour of fuels and oils is illustrated hereafter, by reference to the performance of a range of synthesised block copolymers as cold flow improvers for diesel fuel.

Performance of Copolymers as Fuel Additives

Based on the worked examples above, diblock copolymers were made as shown in the table below, in each case starting from the specified compound (II) produced in step a) of the reaction as shown. Benzoyl peroxide was used as an initiator in all cases.

In each case, the diblock polymer produced was thereafter tested for its ability to improve (i.e. lower) the cold filter plugging point temperature ("CFPP" temperature) of a base diesel fuel having an untreated CFPP temperature of −7° C. The diesel fuel had a density at 15° C. of 830.8 kg m$^{-3}$, an initial boiling point of 183° C. and a final boiling point of 362° C. In each case, the polymer was added to the base fuel via the preparation of an additive concentrate of the invention, involving the physical mixing of the polymer and organic carrier liquid (aromatic solvent) using a laboratory rotary blender, and thereafter doped into the fuel in an amount of 250 parts per million by weight (wppm) to determine the fuel's response to the additive in each case.

As can be seen from the results in the table below, the polymers of the invention, when used as additives for diesel fuel, brought about significant improvements in the cold flow behaviour over the base fuel, as evidenced by the depression of the cold filter plugging point (CFPP) temperature in the range of tests shown. As a result, the treated fuels are less likely to give rise to problems of filter blocking after periods of cold storage, or during use at cold temperatures.

| Compound (II) | 1-alkene in compound (II) (mol %) | Monomer for free-radical polymerisation | Molecular weight (Mn) | CFPP temperature (° C.) |
|---|---|---|---|---|
| PE-i-DIB | n/a | n-butyl acrylate | 12,000 | −12.0 |
| PE-i-DIB | n/a | n-$C_{14}$ methacrylate | 18,000 | −12.0 |
| PE-i-DIB | n/a | n-$C_{14}$ methacrylate | 13,000 | −12.0 |
| P(E/H)-i-DIB | 1-hexene (13.1) | n-butyl acrylate | 4,500 | −16.0 |
| P(E/H)-i-DIB | 1-hexene (9.7) | n-butyl acrylate | 26,000 | −13.0 |
| P(E/H)-i-DIB | 1-hexene (6.2) | n-butyl acrylate | 6,000 | −14.0 |
| P(E/O)-i-DIB | 1-octene (11.2) | n-butyl acrylate | 7,000 | −14.0 |
| P(E/H)-i-DIB | 1-hexene (6.2) | vinyl-2- | 6,000 | −16.0 |

-continued

| Compound (II) | 1-alkene in compound (II) (mol %) | Monomer for free-radical polymerisation | Molecular weight (Mn) | CFPP temperature (° C.) |
|---|---|---|---|---|
| P(E/H)-i-DIB | 1-hexene (6.2) | ethylhexanoate n-butyl acrylate | 7,000 | −17.0 |
| P(E/H)-i-DIB | 1-hexene (6.2) | n-C$_{14}$ methacrylate | 10,000 | −16.0 |

From the results, it is evident that the diblock copolymer functions in its own right as a cold flow improver.

Further CFPP testing was conducted using the copolymers of the invention in combination with a conventional ethylene vinyl acetate (EVA) copolymer diesel cold flow improver additive. This EVA had a vinyl acetate content of 18 mol % and a molecular weight (Mn) of 3,200 The combined amount of copolymers added to the diesel fuel was 250 wppm, this being composed of 80 parts of the EVA and 20 parts of the copolymers of the invention. Results are shown in the following table. The diesel fuel was the same fuel as the one used in the testing reported above.

| Compound (II) | 1-alkene in compound (II) (mol %) | Monomer for free-radical polymerisation | Molecular weight (Mn) | CFPP temperature (° C.) |
|---|---|---|---|---|
| PE-i-DIB | n/a | styrene | 48,000 | −20.0 |
| PE-i-DIB | n/a | vinyl-2-ethylhexanoate | 6,000 | −20.0 |
| PE-i-DIB | n/a | vinyl-2-ethylhexanoate | 8,000 | −21.0 |
| PE-i-DIB | n/a | n-C$_{14}$ methacrylate | 19,000 | −19.0 |
| PE-i-DIB | n/a | n-C$_{14}$ methacrylate | 25,000 | −20.0 |
| P(E/H)-i-DIB | 1-hexene (13.1) | n-butyl acrylate | 4,500 | −21.0 |
| P(E/H)-i-DIB | 1-hexene (9.7) | n-butyl acrylate | 26,000 | −24.0 |
| P(E/H)-i-DIB | 1-hexene (6.2) | n-butyl acrylate | 6,000 | −21.0 |
| P(E/O)-i-DIB | 1-octene (11.2) | n-butyl acrylate | 7,000 | −23.0 |
| P(E/H)-i-DIB | 1-hexene (6.2) | vinyl-2-ethylhexanoate | 6,000 | −26.0 |
| P(E/H)-i-DIB | 1-hexene (6.2) | n-butyl acrylate | 7,000 | −25.0 |
| P(E/H)-i-DIB | 1-hexene (6.2) | n-C$_{14}$ methacrylate | 10,000 | −23.0 |

The combination of the copolymers of the invention with the conventional EVA additive provided the fuel with excellent low temperature properties.

The determination of the improvement at a range of treat rates allows the skilled person to draw conclusions about the necessary amount of each additive required to provide optimum (or other target) performance when employing the method and use of the invention.

What is claimed is:

1. An additive concentrate comprising a functionalised diblock copolymer in admixture with an organic liquid miscible with fuel or oil, the copolymer comprising two polymeric blocks wherein:
   (i) the first block consists of a chain of ethylenic structural units, optionally interrupted by one or more structural units derived from 1-alkene co-monomers higher than ethylene, and
   (ii) the second block comprises a chain of structural units derived from one or more α,β-unsaturated monomers selected from styrene, substituted styrene, acrylate, methacrylate, diene compounds, vinyl esters, fumarate esters and maleic anhydride and derivatives thereof,
and wherein said first and second blocks are terminally joined such that the copolymer has the following structure:

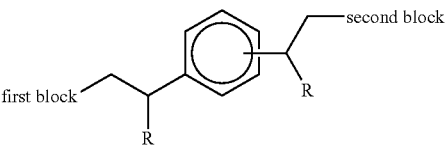

wherein each R group independently represents an alkyl or aryl group, and wherein the aromatic ring substituent joined to the second block is positioned meta or para to the aromatic ring substituent joined to the first block.

2. The additive concentrate of claim 1 wherein each R group independently represents an alkyl group having from 1 to 4 carbon atoms.

3. The additive concentrate of claim 2 wherein each R group is methyl.

4. The additive concentrate of claim 1 wherein, in the copolymer, the aromatic ring substituent joined to the second block is positioned meta to the aromatic ring substituent joined to the first block.

5. The additive concentrate of claim 1 wherein, in the copolymer, the first block consists of a polyethylene chain.

6. The additive concentrate of claim 1 wherein, in the copolymer, the first block of the copolymer consists of a polyethylene chain interrupted by structural units derived from 1-hexene or 1-octene.

7. The additive concentrate of claim 1 wherein, in the copolymer, the second block consists of a chain of structural units derived from one or more α,β-unsaturated monomers selected from styrene, substituted styrene, acrylate, methacrylate, diene compounds, vinyl esters, fumarate esters and maleic anhydride and derivatives thereof.

8. The additive concentrate of claim 7 wherein the second block of the copolymer consists of a homo- or copolymeric chain derived from one or more acrylate or methacrylate monomers.

9. The additive concentrate of claim 7 wherein, in the copolymer, the second block consists of homo- or copolymeric chain derived from one or more vinyl esters.

10. The additive concentrate of claim 1 wherein the first block of the copolymer has a number average molecular weight (Mn), as measured by GPC against polystyrene standards, in the range of 500 to 10,000.

11. The additive concentrate of claim 1 wherein the second block of the copolymer has a number average molecular weight (Mn), as measured by GPC against polystyrene standards, in the range of 1,000 to 100,000.

12. A fuel or oil composition comprising:
   (i) a fuel or oil derived from one or more petroleum, animal, vegetable or synthetic sources, the fuel or oil containing one or more n-alkyl-, iso-alkyl- or n-alkenyl-substituted compounds exhibiting a tendency to crystallise from the fuel or oil in cold storage or use thereby adversely affecting the cold flow behaviour of the fuel or oil, and
   (ii) the additive concentrate of claim 1, wherein the additive concentrate is present in the composition in an amount sufficient to improve the cold flow behaviour of the fuel or oil during cold storage or use.

13. The composition of claim 12, wherein the fuel or oil is a diesel fuel or heating oil, or a lubricating oil.

14. A method of improving the cold flow behaviour of a fuel or oil composition derived from one or more petroleum, animal, vegetable or synthetic sources and containing one or more n-alkyl-, iso-alkyl- or n-alkenyl-substituted compounds exhibiting a tendency to crystallise from the fuel or oil in cold storage or use thereby adversely affecting the cold flow behaviour of the fuel or oil, the method comprising:
(i) determining the cold flow behaviour of the fuel or oil in question and the improvement that is required;
(ii) determining the amount of the additive concentrate of claim 1 necessary to effect the desired improvement in cold flow behaviour; and
(iii) treating the fuel or oil with that determined amount of said additive concentrate.

15. A functionalised diblock copolymer comprising two polymeric blocks wherein:
(i) the first block consists of a chain of ethylenic structural units, optionally interrupted by one or more structural units derived from 1-alkene co-monomers higher than ethylene, and
(ii) the second block comprises a chain of structural units derived from one or more α,β-unsaturated monomers selected from styrene, substituted styrene, acrylate, methacrylate, diene compounds, vinyl esters, fumarate esters and maleic anhydride and derivatives thereof, and wherein said first and second blocks are terminally joined such that the copolymer has the following structure:

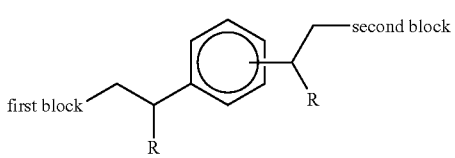

wherein each R group independently represents an alkyl or aryl group, and wherein the aromatic ring substituent joined to the second block is positioned meta or para to the aromatic ring substituent joined to the first block.

16. A process for manufacture of a functionalised diblock copolymer comprising two polymeric blocks wherein:
(i) the first block consists of a chain of ethylenic structural units, optionally interrupted by one or more structural units derived from 1-alkene co-monomers higher than ethylene, and
(ii) the second block comprises a chain of structural units derived from one or more α,β-unsaturated monomers selected from styrene, substituted styrene, acrylate, methacrylate, diene compounds, vinyl esters, fumarate esters and maleic anhydride and derivatives thereof, and wherein said first and second blocks of the copolymer are terminally joined such that the copolymer has the following structure:

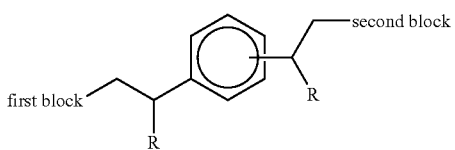

wherein each R group independently represents an alkyl or aryl group, and wherein the aromatic ring substituent joined to the second block is positioned meta or para to the aromatic ring substituent joined to the first block;
the process comprising the following steps:
a) in a first step, polymerising ethylene, and optionally one or more 1-alkene co-monomers higher than ethylene, in the presence of a metallocene catalyst system to form a first polymer block, being a chain consisting of ethylenic structural units optionally bearing pendent alkyl groups originating from 1-alkene comonomer(s), the reaction being carried out in the presence of a compound of the formula (I):

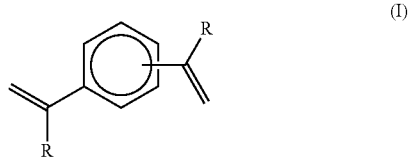

in a reaction vessel pressurised with hydrogen gas, wherein, in the course of the reaction, the compound (I) is terminally incorporated onto the first polymer block resulting in the formation of a terminally unsaturated intermediate of the formula (II):

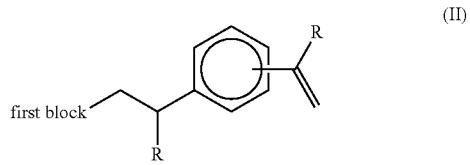

b) in a second step, recovering the intermediate (II) from the reaction mixture of the first step; and
c) in a third step, reacting the intermediate (II) at its terminal double bond in a subsequent free-radical polymerisation reaction to form a second polymer block, so yielding a diblock polymer of the structure defined above.

17. The process of claim 16, wherein the compound (I) has the structure:

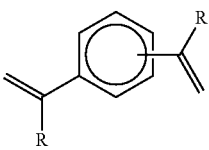

wherein each R group independently represents an alkyl group having from 1 to 4 carbon atoms.

18. The process of claim 17, wherein the compound (I) has the structure:

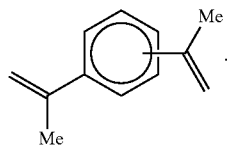

19. The process of claim 16, wherein, in the compound of formula (I), the aromatic ring substituent joined to the second block is positioned meta to the substituent joined to the first block.

* * * * *